United States Patent
Yoshida et al.

(10) Patent No.: US 10,067,343 B2
(45) Date of Patent: Sep. 4, 2018

(54) LIQUID CRYSTAL DISPLAY DEVICE FOR HEAD-UP DISPLAY DEVICE, AND HEAD-UP DISPLAY DEVICE

(71) Applicant: ORTUS TECHNOLOGY CO., LTD., Hino (JP)

(72) Inventors: Tetsushi Yoshida, Hino (JP); Minoru Yamaguchi, Hino (JP); Kazuhiko Oosawa, Hino (JP); Tetsuya Kusuno, Hino (JP)

(73) Assignee: ORTUS TECHNOLOGY CO., LTD., Tokyo (JP)

( * ) Notice: Subject to any disclaimer, the term of this patent is extended or adjusted under 35 U.S.C. 154(b) by 76 days.

(21) Appl. No.: 15/184,234

(22) Filed: Jun. 16, 2016

(65) Prior Publication Data
US 2016/0299341 A1 Oct. 13, 2016

Related U.S. Application Data

(63) Continuation of application No. PCT/JP2014/064994, filed on Jun. 5, 2014.

(30) Foreign Application Priority Data

Dec. 18, 2013 (JP) ................................. 2013-261640

(51) Int. Cl.
*G02B 27/01* (2006.01)
*G02F 1/1368* (2006.01)
(Continued)

(52) U.S. Cl.
CPC ....... *G02B 27/0101* (2013.01); *G02F 1/1339* (2013.01); *G02F 1/1368* (2013.01);
(Continued)

(58) Field of Classification Search
CPC ......... G02F 1/133514; G02F 2201/121; G02F 2202/28; G02F 2413/05;
(Continued)

(56) References Cited

U.S. PATENT DOCUMENTS

2001/0008394 A1* 7/2001 Kanamori ............... G02B 27/01
345/7
2002/0176036 A1* 11/2002 Kaneko ............. G02F 1/133536
349/65
(Continued)

FOREIGN PATENT DOCUMENTS

CN 100426503 C 10/2008
CN 102053421 A 5/2011
(Continued)

OTHER PUBLICATIONS

International Preliminary Report on Patentability dated Jun. 30, 2016 in corresponding International Patent Application No. PCT/JP2014/064994.
(Continued)

*Primary Examiner* — Edward Glick
*Assistant Examiner* — Shan Liu

(57) ABSTRACT

A liquid crystal display device for a head-up display device includes: a light source unit including a reflection film provided on a substrate, and a light-emitting element; a liquid crystal display element including a first polarizer provided on the light source unit side, and a second polarizer disposed to be opposed to the first polarizer via a liquid crystal layer; a retardation plate provided between the reflection film and the first polarizer, and imparting a retardation of λ/4 to light; a reflective polarizer provided between the retardation plate and the first polarizer, and reflecting a light component which is parallel to a reflection axis; and a
(Continued)

diffusion member provided between the reflective polarizer and the first polarizer, and diffusing light.

10 Claims, 14 Drawing Sheets

(51) Int. Cl.
| | | |
|---|---|---|
| *G02F 1/1335* | (2006.01) | |
| *G02F 1/13363* | (2006.01) | |
| *G02F 1/1339* | (2006.01) | |
| *G02F 1/1343* | (2006.01) | |
| *G02F 1/1333* | (2006.01) | |

(52) U.S. Cl.
CPC ...... *G02F 1/13363* (2013.01); *G02F 1/13439* (2013.01); *G02F 1/133504* (2013.01); *G02F 1/133512* (2013.01); *G02F 1/133514* (2013.01); *G02F 1/133536* (2013.01); *G02F 1/134309* (2013.01); *G02B 2027/0118* (2013.01); *G02F 2001/133302* (2013.01); *G02F 2001/133638* (2013.01); *G02F 2001/134345* (2013.01); *G02F 2201/121* (2013.01); *G02F 2201/123* (2013.01); *G02F 2202/28* (2013.01); *G02F 2413/01* (2013.01); *G02F 2413/05* (2013.01); *G02F 2413/08* (2013.01)

(58) Field of Classification Search
CPC ........ G02F 2001/133302; G02F 2001/134345; G02F 2001/133638; G02F 2201/34; G02F 2201/343; G02F 2201/346; G02F 1/133555; G02F 2001/133543; G02F 1/133536; G02F 1/13718; G02F 1/13362; G02F 2001/0151; G02F 2001/13356; G02F 2001/133562; G02F 2001/133565; G02F 2202/40; G02F 2413/00; G02F 2413/11; G02F 2413/12; G02F 2413/14; G02F 2413/08; G02F 1/1336; G02F 2001/133607; G02F 2001/133616; G02F 1/13731; G02F 1/0311; G02F 1/116; G02F 1/1335; G02F 1/133528; G02F 1/133533; G02F 1/13439; G02F 1/1368; G02F 1/133504; G02F 1/133512; G02F 1/13363; G02F 1/1339; G02F 1/134309; G02F 2201/123; G02F 2413/01; G02F 2001/133557; G02F 1/0063; G02F 1/0131; G02F 1/139; G02F 1/133634; G02F 2001/133567; G02F 1/133606; G02F 1/133615; G02F 1/133605; G02F 2001/133531; G02F 2001/133521; G02F 2001/133538; G02F 2001/133541; G02F 2001/133545; G02F 2001/133548; G02F 2001/13355; G02F 2203/16; G09G 2300/0486; G09G 2300/0495; H01L 51/5293; H01R 12/7005; G02B 27/0101; G02B 2027/0118; G02B 5/3016; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 5/3033; G02B 6/0056; G02B 6/02109; B29D 11/00644; B32B 17/10458; B32B 2307/42; H04B 10/532; G01J 5/0825; G03F 9/7065; G01R 33/3678; C09K 19/0208

USPC ........ 349/113–115, 117–121, 62, 64, 65, 67, 349/168, 169, 175, 176, 185, 96–103
See application file for complete search history.

(56) References Cited

U.S. PATENT DOCUMENTS

| | | | |
|---|---|---|---|
| 2004/0218388 A1* | 11/2004 | Suzuki | G02F 1/133603 362/231 |
| 2004/0246392 A1* | 12/2004 | Maruyama | G02B 27/0101 349/11 |
| 2006/0007553 A1 | 1/2006 | Bogner et al. | |
| 2006/0290846 A1* | 12/2006 | Kim | G02F 1/13362 349/113 |
| 2007/0164955 A1* | 7/2007 | Noguchi | G02B 27/0101 345/89 |
| 2008/0158877 A1* | 7/2008 | Hsieh | G02F 1/13362 362/235 |
| 2009/0296024 A1* | 12/2009 | Kanaya | B32B 27/30 349/64 |
| 2011/0007246 A1* | 1/2011 | Moon | G02F 1/133536 349/96 |
| 2011/0043723 A1* | 2/2011 | Dijon | G02F 1/13362 349/64 |
| 2011/0273643 A1* | 11/2011 | Arai | G02F 1/133528 349/64 |
| 2012/0099048 A1* | 4/2012 | Yamazaki | G02F 1/133514 349/62 |
| 2012/0300486 A1 | 11/2012 | Matsushita et al. | |
| 2013/0271707 A1* | 10/2013 | Sakamoto | G02F 1/139 349/106 |
| 2014/0204281 A1* | 7/2014 | Maeda | G02F 1/133611 348/794 |
| 2015/0009681 A1* | 1/2015 | Takase | G02F 1/133603 362/308 |
| 2015/0036317 A1* | 2/2015 | Yamamoto | G02F 1/133605 362/84 |
| 2015/0109561 A1 | 4/2015 | Fuchida et al. | |

FOREIGN PATENT DOCUMENTS

| | | |
|---|---|---|
| JP | 10-221691 | 8/1998 |
| JP | 2003-137004 | 5/2003 |
| JP | 2003-279988 | 10/2003 |
| JP | 2007-219489 | 8/2007 |
| JP | 2011-88583 | 5/2011 |
| JP | 2011-100051 | 5/2011 |
| KR | 10-2011-0051147 | 5/2011 |
| WO | WO 01/22130 A1 | 3/2001 |
| WO | WO 2007/030447 A2 | 3/2007 |
| WO | WO 2013/154125 A1 | 10/2013 |

OTHER PUBLICATIONS

International Search Report dated Aug. 19, 2014 in corresponding International Application No. PCT/JP2014/064994.
Extended European Search Report dated Jul. 17, 2017 in corresponding European Patent Application No. 14871610.3.
Japanese Office Action dated Jun. 20, 2017 in corresponding Japanese Patent Application No. 2013-261640.
Korean Office Action dated Sep. 20, 2017 in corresponding Korean Patent Application No. 10-2016-7016318.
Chinese Office Action dated Oct. 24, 2017 in corresponding Chinese Patent Application No. 201480069218.0.
Korean Office Action dated Mar. 29, 2018 in corresponding Korean Application No. 2016-7016318.
European Office Action dated May 4, 2018 in corresponding European Application No. 14 871 610.3.

* cited by examiner

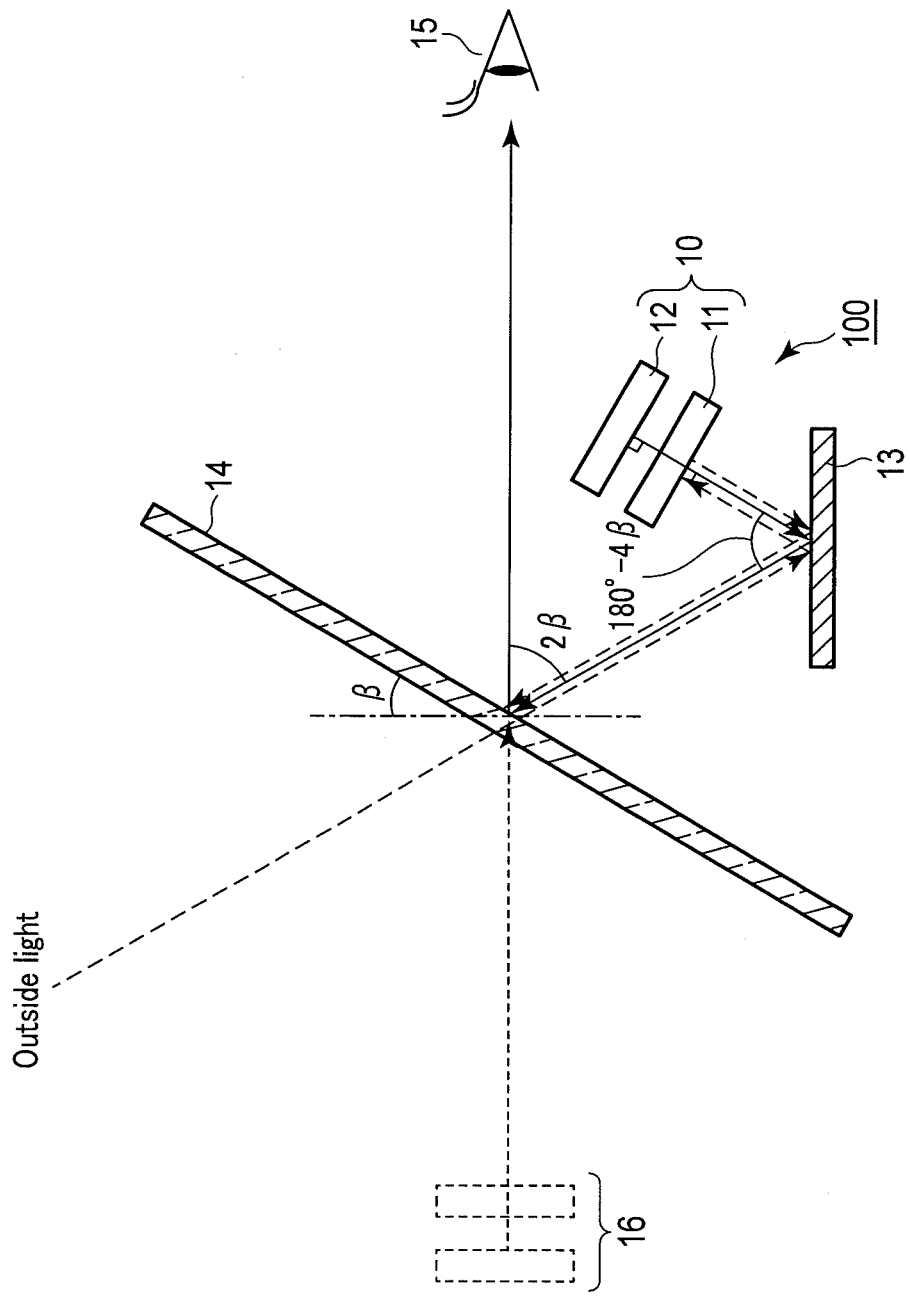
F I G. 1

|  | White luminance |
|---|---|
| Comparative example 1 | 100 |
| Comparative example 2 | 109 |
| Embodiment | 170 |

White luminance in comparative example 1 is set as 100

F I G. 8

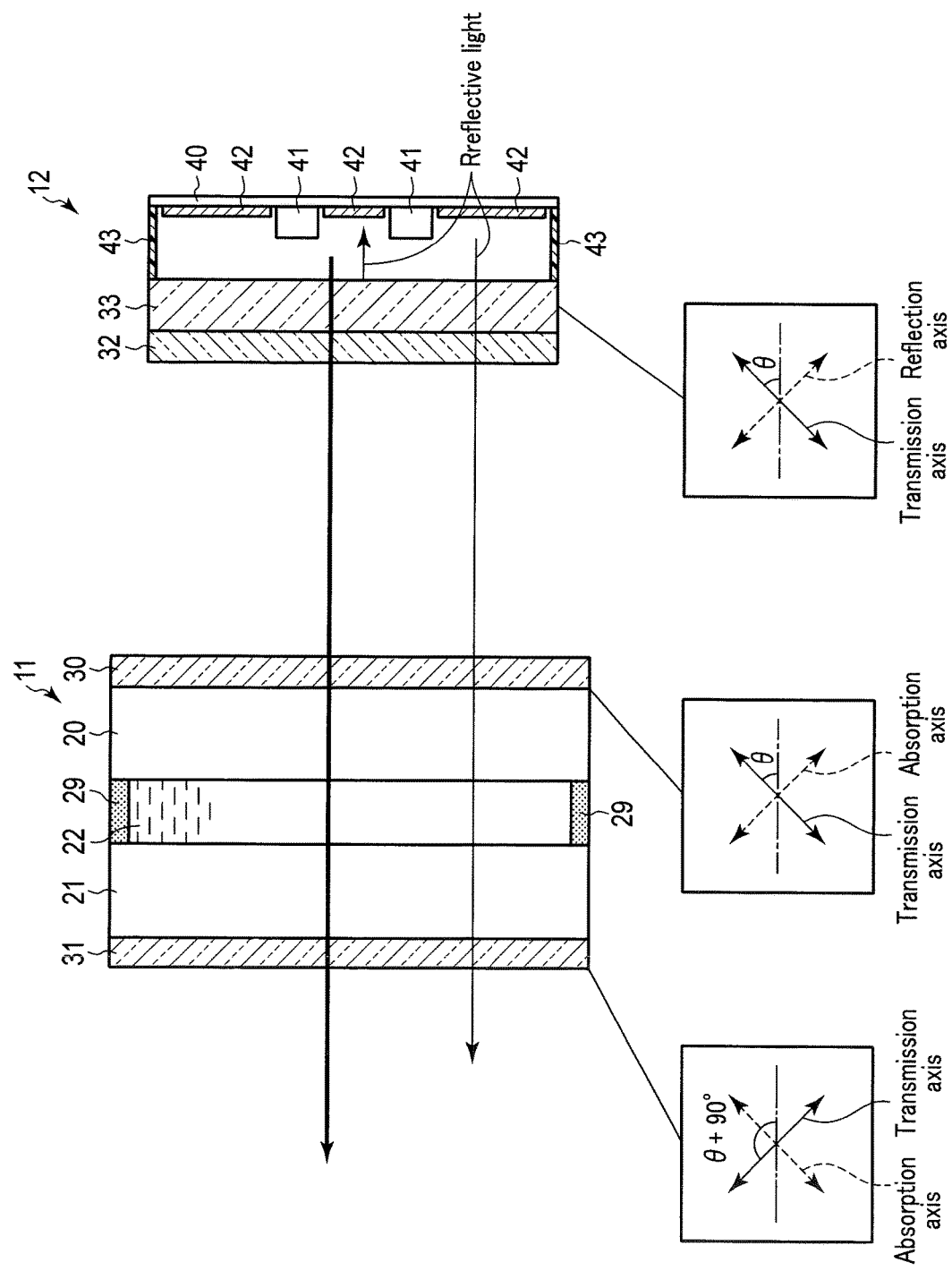
F I G. 10

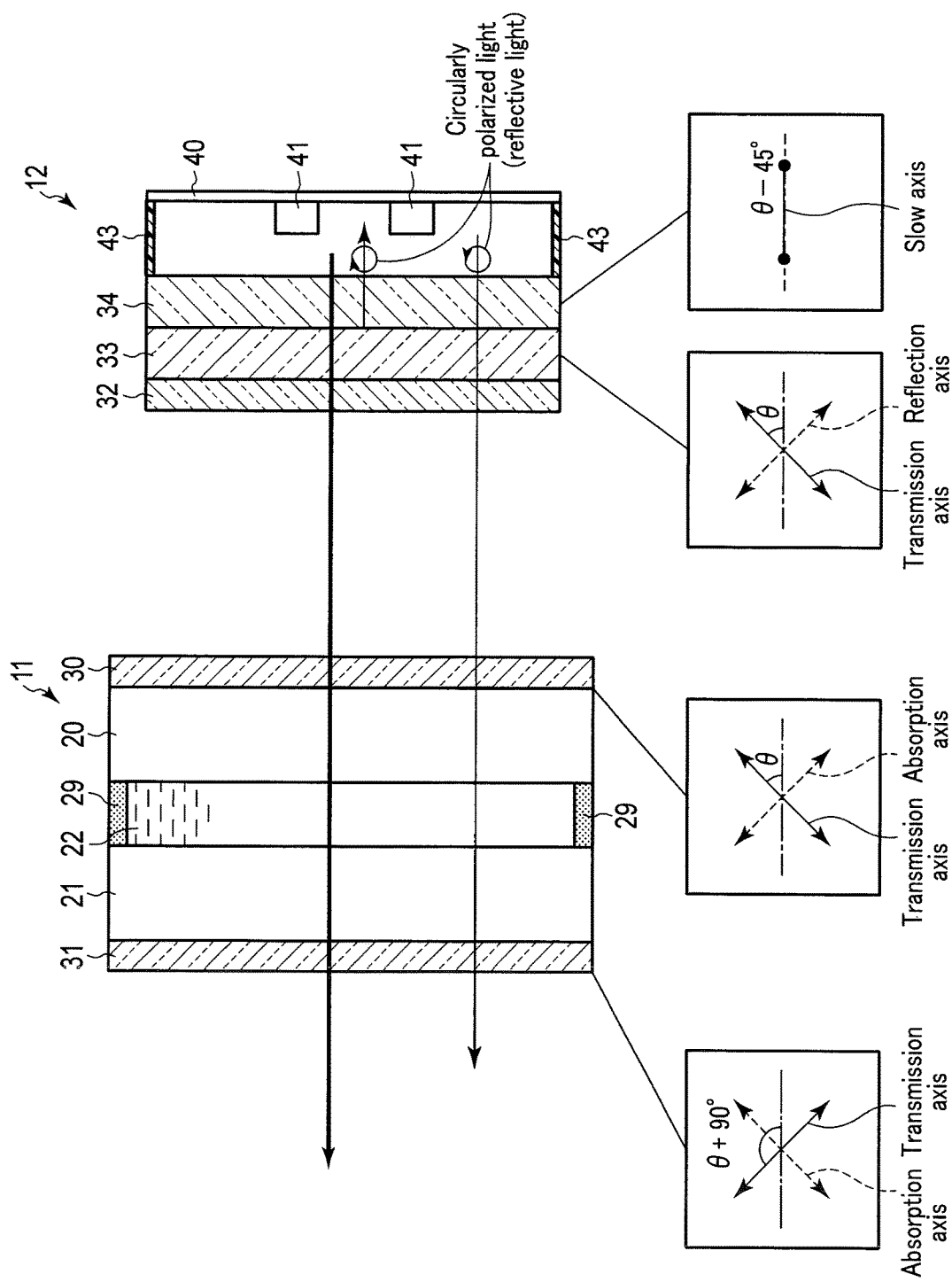
F I G. 12

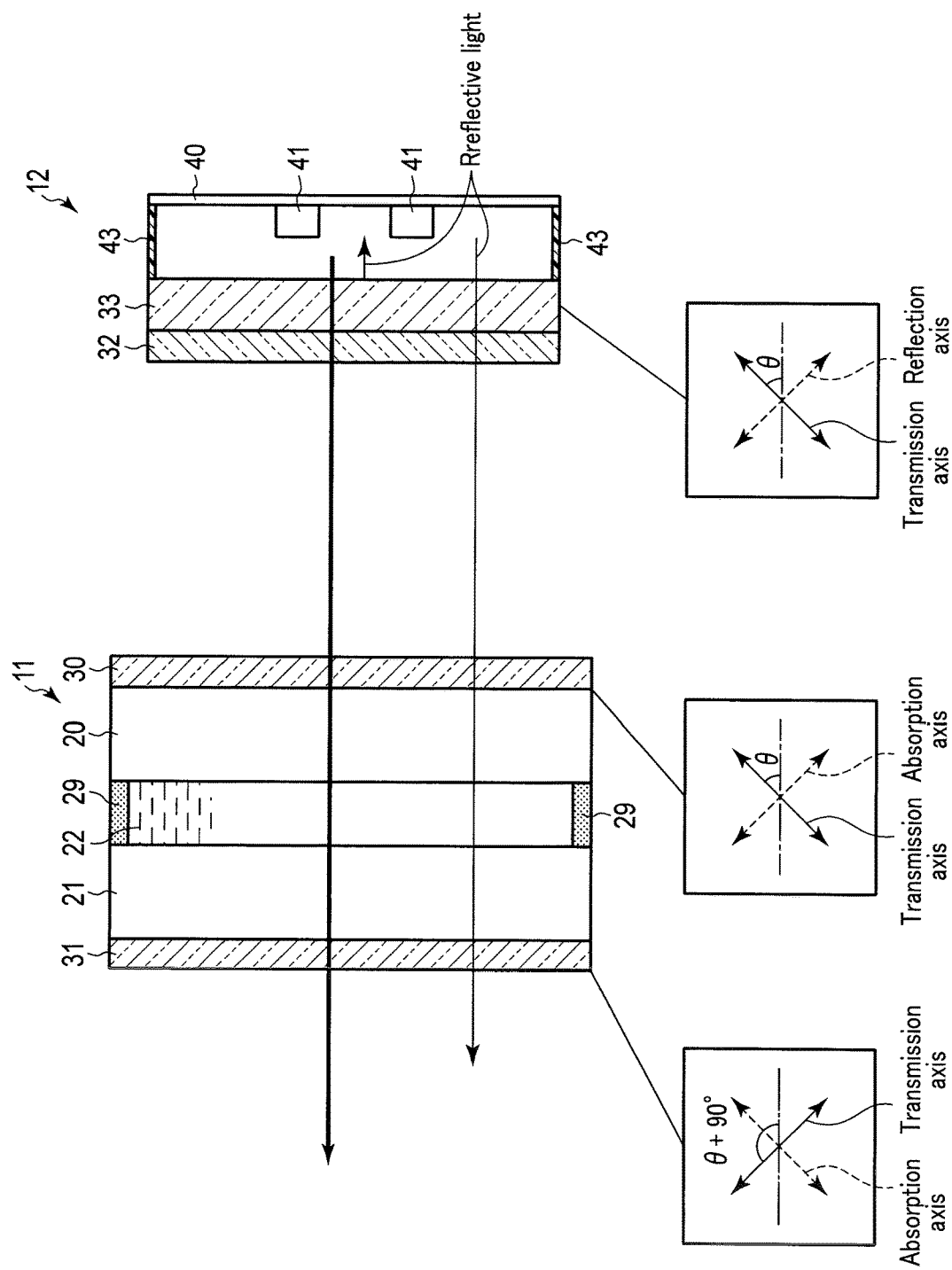
F I G. 14

LIQUID CRYSTAL DISPLAY DEVICE FOR HEAD-UP DISPLAY DEVICE, AND HEAD-UP DISPLAY DEVICE

CROSS-REFERENCE TO RELATED APPLICATIONS

This application is a Continuation Application of PCT Application No. PCT/JP2014/064994, filed Jun. 5, 2014, and based upon and claiming the benefit of priority from Japanese Patent Application No. 2013-261640, filed Dec. 18, 2013, the entire contents of all of which are incorporated herein by reference.

BACKGROUND OF THE INVENTION

1. Field of the Invention

The present invention relates to a liquid crystal display device for a head-up display device, and a head-up display device, and more particularly to a head-up display device using a liquid crystal display device.

2. Description of the Related Art

There is known a head-up display (HUD) device which projects display light from a liquid crystal display device onto a windshield of a vehicle, for example, and displays a virtual image (display image). In this head-up display device, for example, illumination light from a backlight passes through a liquid crystal display device as display light, and the display light is reflected by a reflecting mirror (or a concave mirror). By projecting the reflected light onto a display member such as a windshield or a combiner, a driver visually recognizes a virtual image which is displayed on the display member. Thereby, the driver can read information, without substantially moving the view field from the driving state.

In the head-up display device, because of the configuration thereof, there is a case in which part of light (outside light) such as sunlight from the outside (in particular, a light component which is parallel and opposite to the optical path of the backlight) is radiated on the liquid crystal display device which is used for the head-up display device. In this case, an unnecessary image, which is not to be displayed, appears on the windshield, due to the outside light reflected on the display surface of the liquid crystal display device. Thereby, the display characteristics of the liquid crystal display device deteriorate.

In addition, if the intensity (luminance) of light, which passes through the liquid crystal display device, is low, a virtual image, which is projected on the windshield, becomes dark, and the unnecessary image due to the outside light becomes more conspicuous. As a result, the display characteristics of the liquid crystal display device deteriorate.

BRIEF SUMMARY OF THE INVENTION

According to an aspect of the present invention, there is provided a liquid crystal display device for a head-up display device, comprising:

a light source unit including a reflection film provided on a substrate, and a light-emitting element;

a liquid crystal display element including a first polarizer provided on the light source unit side, and a second polarizer disposed to be opposed to the first polarizer via a liquid crystal layer;

a retardation plate provided between the reflection film and the first polarizer, and imparting a retardation of $\lambda/4$ to light;

a reflective polarizer provided between the retardation plate and the first polarizer, and reflecting a light component which is parallel to a reflection axis; and a diffusion member provided between the reflective polarizer and the first polarizer, and diffusing light.

According to an aspect of the present invention, there is provided a liquid crystal display device for a head-up display device, comprising:

a light source unit including a light-emitting element provided on a substrate;

a liquid crystal display element including a first polarizer provided on the light source unit side, and a second polarizer disposed to be opposed to the first polarizer via a liquid crystal layer;

a retardation plate provided between the light source unit and the first polarizer, and imparting a retardation of $\lambda/4$ to light;

a reflective polarizer provided between the retardation plate and the first polarizer, and reflecting a light component which is parallel to a reflection axis; and a diffusion member provided between the reflective polarizer and the first polarizer, and diffusing light.

According to an aspect of the present invention, there is provided a liquid crystal display device for a head-up display device, comprising:

a light source unit including a reflection film provided on a substrate, and a light-emitting element;

a liquid crystal display element including a first polarizer provided on the light source unit side, and a second polarizer disposed to be opposed to the first polarizer via a liquid crystal layer;

a reflective polarizer provided between the reflection film and the first polarizer, and reflecting a light component which is parallel to a reflection axis; and a diffusion member provided between the reflective polarizer and the first polarizer, and diffusing light.

According to an aspect of the present invention, there is provided a liquid crystal display device for a head-up display device, comprising:

a light source unit including a light-emitting element provided on a substrate;

a liquid crystal display element including a first polarizer provided on the light source unit side, and a second polarizer disposed to be opposed to the first polarizer via a liquid crystal layer;

a reflective polarizer provided between the reflection film and the first polarizer, and reflecting a light component which is parallel to a reflection axis; and a diffusion member provided between the reflective polarizer and the first polarizer, and diffusing light.

BRIEF DESCRIPTION OF THE SEVERAL VIEWS OF THE DRAWINGS

FIG. 1 is a cross-sectional view which schematically illustrates a head-up display device according to a first embodiment;

FIG. 8 is a view for explaining white luminances in the comparative example 1, comparative example 2 and embodiment;

FIG. 10 is a cross-sectional view of a liquid crystal display element and a light source unit according to a modification of the second embodiment;

FIG. 12 is a cross-sectional view of a liquid crystal display element and a light source unit according to a modification of the third embodiment;

FIG. 14 is a cross-sectional view of a liquid crystal display element and a light source unit according to a modification of the fourth embodiment.

DETAILED DESCRIPTION OF THE INVENTION

Figure 2:
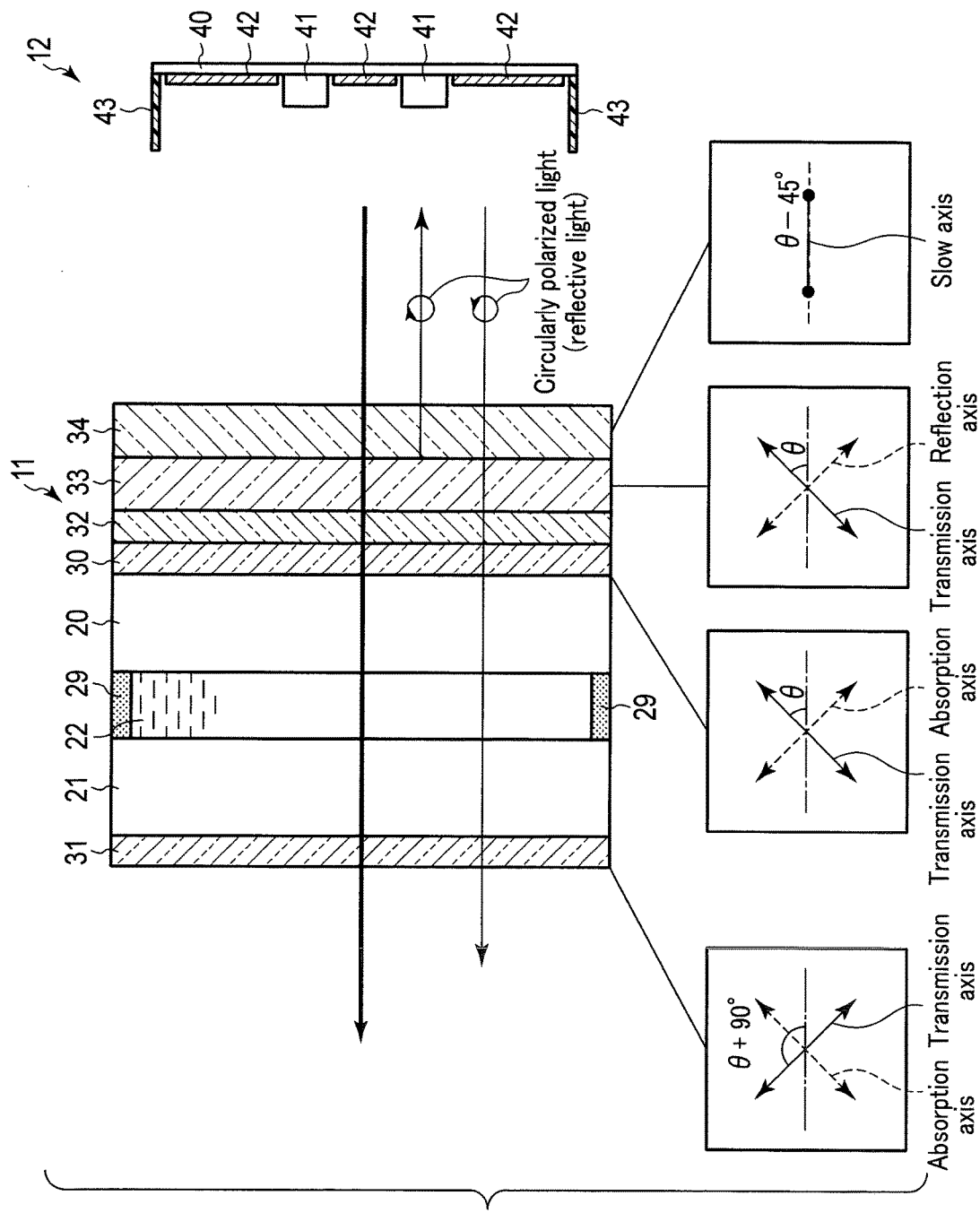
FIG. 2 is a cross-sectional view of a liquid crystal display element and a light source unit according to the first embodiment.

The embodiments of the present invention will be described below with reference to the accompanying drawings. Note that the drawings are schematic and conceptual, and the dimensions, ratios, and the like in the respective drawings are not necessary the same as those in reality. In addition, even the same portion may be shown in a different dimensional relationship or with different ratios in different drawings. Several embodiments to be described below represent examples of apparatuses and methods for embodying the technical idea of the present invention, and the technical idea of the present invention is not specified by the shapes, structures, and layouts of the constituent parts. Note that in the following explanation, the same reference numerals denote elements having the same functions and arrangements, and a repetitive explanation will be made only when necessary.

[First Embodiment]

[1. Configuration of Head-Up Display Device 100]

FIG. 1 is a cross-sectional view which schematically illustrates a head-up display device 100 according to a first embodiment of the present invention. The head-up display device 100 includes a liquid crystal display device 10, a reflection member 13, and a display member 14. The liquid crystal display device 10 includes a liquid crystal display element 11 and a light source unit 12.

The light source unit 12 is composed of, for example, a light source (area light source) having a planar shape, and supplies illumination light to the liquid crystal display element 11. As a light-emitting element included in the light source unit 12, use is made of, for example, a white light emitting diode (LED). The liquid crystal display element 11 passes and optically modulates the illumination light from the light source unit 12. In addition, the liquid crystal display element 11 displays an image indicating driving information such as a vehicle speed.

The reflection member 13 is composed of, for example, a reflecting mirror, and is composed of, concretely, a plane mirror, or a concave mirror. The reflecting mirror 13 reflects display light from the liquid crystal display element 11 toward the display member 14. When a concave mirror is used as the reflecting mirror 13, the concave mirror enlarges, for example, the display light from the liquid crystal display element 11 with a predetermined enlargement ratio.

If the inclination of the display member 14 to a vertical line (gravitational direction) is β, a reflection angle at the reflecting mirror (e.g. plane mirror) 13 is (90°-2β), that is, the angle formed by incident light and reflective light at the plane mirror 13 is (180°-4β). In addition, the reflection angle at the display member 14 is β, that is, the angle formed by incident light and reflective light at the display member 14 is 2β.

The display member 14 is used in order to project display light which is emitted from the liquid crystal display element 11. By reflecting the display light to the driver, the display member 14 displays the display light as a virtual image 16. The display member 14 is, for example, a windshield of a vehicle. In addition, the display member 14 may be a semitransparent screen (combiner) which is exclusively provided for the head-up display device 100. The combiner is used, for example, by being disposed on a dashboard of a vehicle, attached to a rearview mirror disposed in front of a driver 15, or attached to a sun visor disposed at an upper part of the windshield. The combiner is composed of, for example, a transparent base material (e.g. synthetic resin) having a curved surface, and an evaporation-deposition film of titanium oxide, silicon oxide or the like, which is formed on the surface of this base material, and the combiner has a semitransmissive function by this evaporation-deposition film.

As indicated by a solid line in FIG. 1, illumination light, which is emitted from the light source unit 12, passes through the liquid crystal display element 11 and undergoes optical modulation. Display light passing through the liquid crystal display element 11 is reflected by the reflecting mirror 13, and projected on the display member 14. A virtual image (display image) 16, which is obtained by the projection of the display light onto the display member 14, is visually recognized by the driver 15. Thereby, the driver 15 observes the virtual image 16, which is displayed on the front side in the frontal direction of the driver seat, by superimposing the virtual image 16 with the scenery.

On the other hand, as indicated by a broken line in FIG. 1, part of outside light passes through the display member 14, is reflected by the reflecting mirror 13, and is radiated on the liquid crystal display element 11. The outside light is various kinds of lights which are incident from the outside of the display member 14 (the side opposite to the side on which the liquid crystal display element 11 is disposed), and is, for example, light from the outside, such as sunlight. At this time, if the display surface of the liquid crystal display element 11 and the emission surface (surface from which illumination light is emitted) of the light source unit 12 are substantially parallel, the light reflected by the liquid crystal display element 11 travels along an optical path, which is opposite to the optical path of the outside light, and is projected on the display member 14. Consequently, an unnecessary image, which should not normally be displayed, occurs, resulting in degradation in display quality of the display image which the driver 15 visually recognizes. In the meantime, the display surface (substrate surface) of the liquid crystal display element 11 is a surface on which an image, which is optically modulated by the liquid crystal display element 11, is displayed.

FIG. 2 is a cross-sectional view of the liquid crystal display element 11 and light source unit 12 according to the first embodiment. The liquid crystal display element 11 includes a pair of substrates 20 and 21; a liquid crystal layer 22; a sealing member 29 for sealing the liquid crystal layer 22 between the substrate 20 and substrate 21; a pair of polarizers 30 and 31; a diffusion member 32; a reflective polarizer 33; and a retardation plate ($\lambda/4$ plate) 34.

Figure 3:
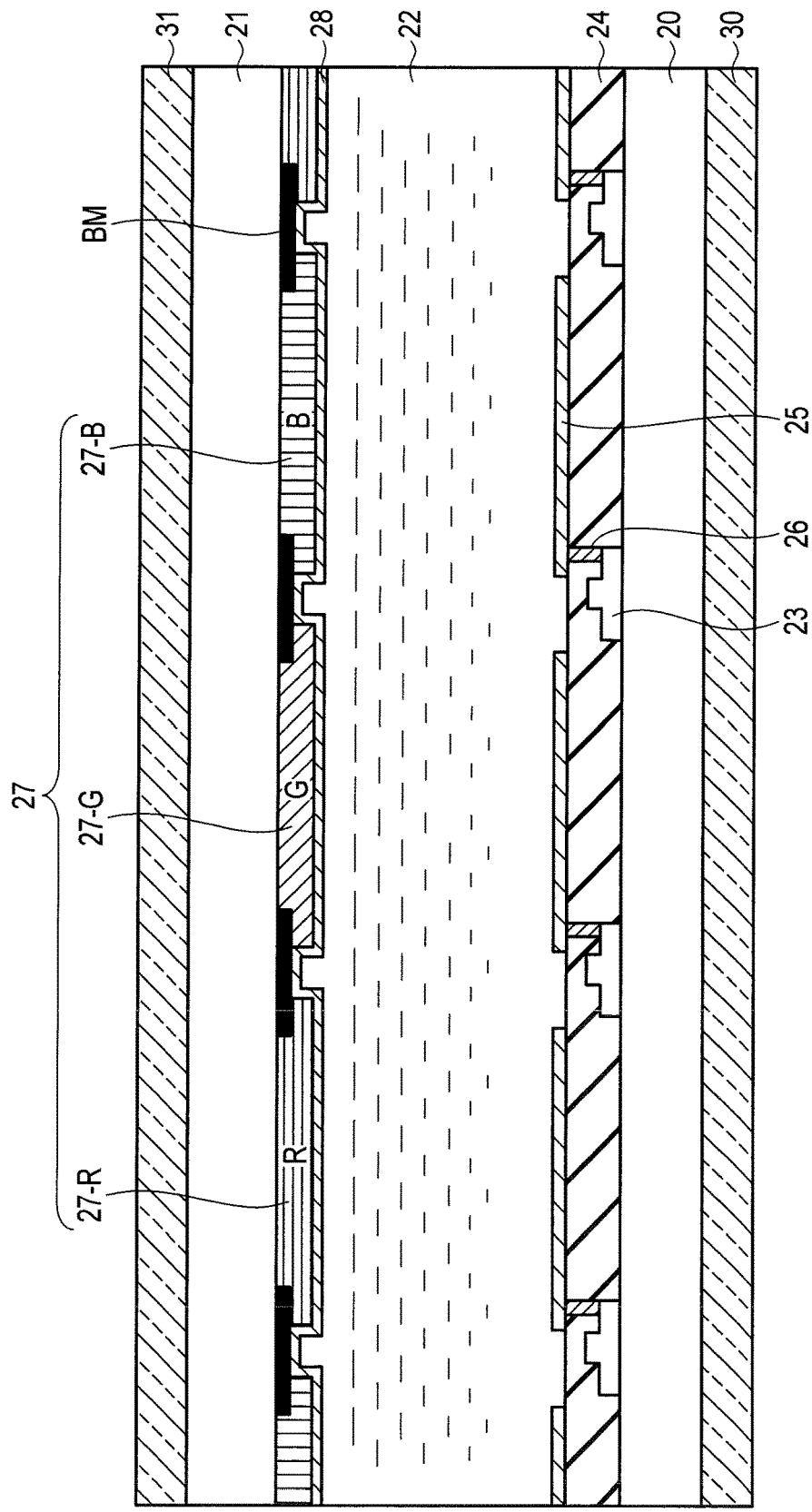
FIG. 3 is a cross-sectional view illustrating a more concrete configuration example of the liquid crystal display element.

FIG. 3 is a cross-sectional view illustrating a more concrete configuration example of the liquid crystal display element 11. Incidentally, FIG. 3 illustrates, in an extracted manner, the members between the polarizers 30 and 31.

The liquid crystal display element 11 includes a TFT substrate 20 on which switching transistors and pixel electrodes are formed; a color filter substrate (CF substrate) 21 on which a color filter and a common electrode are formed and which is disposed to be opposed to the TFT substrate 20; and a liquid crystal layer 22 which is held between the TFT substrate 20 and CF substrate 21. Each of the TFT substrate 20 and CF substrate 21 is composed of a transparent substrate (e.g. glass substrate). The TFT substrate 20 is disposed to be opposed to the light source unit 12, and illumination light from the light source unit 12 is made incident on the liquid crystal display element 11 from the TFT substrate 20 side. That surface of the CF substrate 21, which is opposite to the side of the light source unit 12, is the display surface of the liquid crystal display element 11.

The liquid crystal layer 22 is composed of a liquid crystal material which is sealed by the sealing member 29 that adheres the TFT substrate 20 and CF substrate 21. The alignment of liquid crystal molecules of the liquid crystal material is operated in accordance with an electric field which is applied between the TFT substrate 20 and CF substrate 21, and thereby the optical characteristics of the liquid crystal material are varied. As the liquid crystal mode, for example, a VA (Vertical Alignment) mode is used. However, needless to say, other liquid crystal modes, such as a TN (Twisted Nematic) mode and homogeneous mode, may be used.

A plurality of switching transistors 23 are provided on that side of the TFT substrate 20, which faces the liquid crystal layer 22. As the switching transistors 23, for example, thin-film transistors (TFTs) are used. The switching transistor 23 includes a gate electrode which is electrically connected to a scanning line (not shown); a gate insulating film provided on the gate electrode; a semiconductor layer (e.g. an amorphous silicon layer) provided on the gate insulating film; and a source electrode and a drain electrode which are provided spaced apart on the semiconductor layer. The source electrode is electrically connected to a signal line (not shown).

An insulating layer 24 is provided on the switching transistors 23. A plurality of pixel electrodes 25 are provided on the insulating layer 24. Contact plugs 26, which are electrically connected to the pixel electrodes 25, are provided in the insulating layer 24 and on the drain electrodes of the switching transistors 23.

A color filter 27 is provided on that side of the CF substrate 21, which faces the liquid crystal layer 22. The color filter 27 includes a plurality of color filters (color members), and includes, concretely, a plurality of red filters 27-R, a plurality of green filters 27-G, and a plurality of blue filters 27-B. A general color filter is composed of red (R), green (G) and blue (B), which are the three primary colors of light. A set of neighboring three colors, R, G and B, is a unit of display (called "pixel" or "picture element"). A single-color portion of R, G or B in one pixel is a minimum driving unit called "sub-pixel (sub-picture element)". The switching transistor 23 and pixel electrode 25 are provided for each of the sub-pixels.

A black matrix (light shielding film) BM for shielding light is provided at boundary portions of the red filter 27-R, green filter 27-G and blue filter 27-B and at boundary portions of the pixels (sub-pixels). Specifically, the black matrix BM is formed in a mesh shape. The black matrix BM is provided, for example, in order to shield unnecessary light between color members, and to enhance the contrast.

A common electrode 28 is provided on the color filter 27 and black matrix BM. The common electrode 28 is formed in a planar shape over the entirety of the display area of the liquid crystal display element 11.

The polarizers 30 and 31 are provided in a manner to sandwich the TFT substrate 20 and CF substrate 21. The polarizer 30, 31 has a transmission axis and an absorption axis which are perpendicular to each other, in a plane perpendicular to a direction of travel of light. Of the light having planes of vibration in random directions, the polarizer 30, 31 transmits linearly polarized light (a linearly polarized light component) having a plane of vibration parallel to the transmission axis, and absorbs linearly polarized light (a linearly polarized light component) having a plane of vibration parallel to the absorption axis. The polarizers 30 and 31 are arranged such that their transmission axes are perpendicular to each other, that is, arranged in a crossed-Nicol state.

The pixel electrode 25, contact plug 26 and common electrode 28 are composed of transparent electrodes, and ITO (indium tin oxide), for instance, is used. A transparent insulative material is used for the insulating layer 24, and silicon nitride (SiN), for instance, is used.

Referring back to FIG. 2, in the liquid crystal display element 11, the diffusion member 32 is provided on that surface of the polarizer 30, which is opposite to the surface thereof facing the TFT substrate 20. The diffusion member 32 has a function of diffusing (scattering) the transmissive light in random directions, thereby uniformizing the transmissive light. The diffusion member 32 is composed of a diffusion adhesive material, a diffusion film or a diffusion plate. When the diffusion adhesive material is used as the diffusion member 32, the diffusion adhesive material has, in addition to the function of diffusing incident light, a function of adhering the polarizer 30 and reflective polarizer 33. In order to enhance the uniformity of transmissive light, the haze value of the diffusion member 32 is set, for example, in a range of 60% or more and 95% or less.

The reflective polarizer 33 is provided on that surface of the diffusion member 32, which is opposite to the surface thereof facing the polarizer 30. The reflective polarizer 33 has a transmission axis and a reflection axis which are perpendicular to each other, in a plane perpendicular to the direction of travel of light. Of the light having planes of vibration in random directions, the reflective polarizer 33 transmits linearly polarized light (a linearly polarized light component) having a plane of vibration parallel to the transmission axis, and reflects linearly polarized light (a linearly polarized light component) having a plane of vibration parallel to the reflection axis. The transmission axis of the reflective polarizer 33 is set to be parallel to the transmission axis of the polarizer 30. As the reflective polarizer 33, for example, a DBEF (Dual Brightness Enhancement Film) of 3M, or a wire-grid polarizer of Asahi Kasei Corporation, may be used.

The retardation plate (λ/4 plate) 34 is provided on that surface of the reflective polarizer 33, which is opposite to the surface thereof facing the diffusion member 32. The retardation plate 34 has a refractive index anisotropy, and has a slow axis and a fast axis, which are perpendicular to each other, in a plane perpendicular to the direction of travel of light. The retardation plate 34 has a function of imparting a predetermined retardation (retardation of λ/4 when λ is wavelength of transmissive light) between lights of predetermined wavelengths passing through the slow axis and fast axis. Specifically, the retardation plate 34 is composed of a λ/4 plate. The slow axis of the retardation plate 34 is set at an angle of 45° to the transmission axis of the reflective polarizer 33.

In the meantime, the plan views of the polarizers, reflective polarizer and retardation plate in FIG. 2 are plan views as viewed from the light source unit 12 side. In addition, in the plan views in FIG. 2, the angle of the transmission axis of the polarizer 30 to the horizontal direction is expressed as θ. The angle θ may be arbitrarily set.

Figure 4:
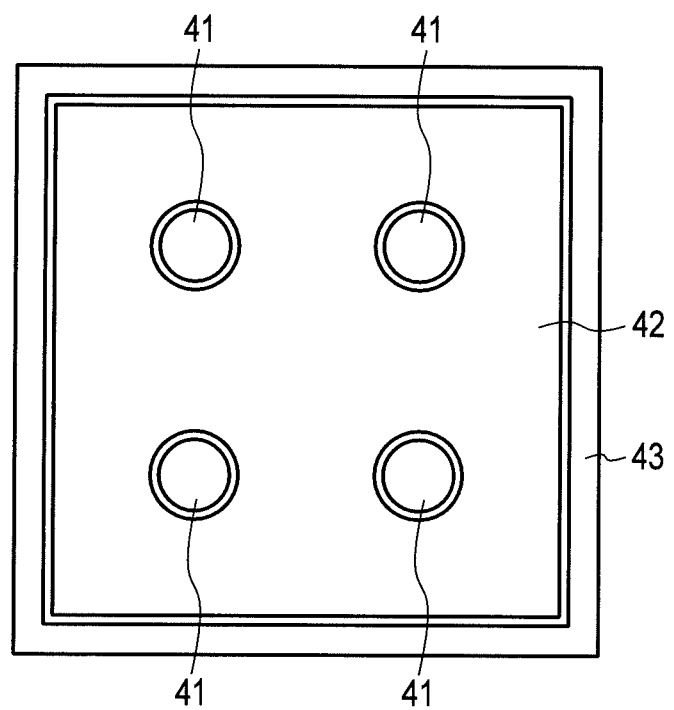
FIG. 4 is a plan view of the light source unit.

Next, referring to FIG. 2 and FIG. 4, the configuration of the light source unit 12 is described. FIG. 4 is a plan view of the light source unit 12, as viewed from the liquid crystal display element 11 side.

The light source unit 12 includes a substrate 40, a plurality of light-emitting elements 41, a reflection film (reflection plate) 42, and a case 43. The light-emitting elements 41 are provided on the substrate 40. Each of the light-emitting elements 41 is composed of, for example, a white LED. In FIG. 4, although four light-emitting elements 41 are illustrated by way of example, the number of light-emitting elements 41 may be designed as an arbitrary number. The number of light-emitting elements 41 may be one, or may be a plural number other than four. The substrate 40 is composed of a circuit board on which wiring for supplying power to the light-emitting elements 41 is provided. The surface of the substrate 40 is disposed parallel to the surface of the TFT substrate 20 or CF substrate 21 of the liquid crystal display element 11.

The reflection film 42 is provided on that region of the substrate 40, where the light-emitting elements 41 are not provided. Specifically, the reflection film 42 includes a plurality of opening portions having substantially the same plan-view shapes as the respective light-emitting elements 41. The reflection film 42 reflects once again light, which is made incident from the liquid crystal display element 11 side, to the liquid crystal display element 11 side. In addition, the case 43, which surrounds the plural light-emitting elements 41 and reflection film 42, is provided on the substrate 40. The outer shapes of the substrate 40 and case 43 are, for example, rectangular.

[2. Operation]

Next, the operation of the head-up display device 100 with the above-described configuration is described.

Illumination light emitted from the light-emitting elements 41 passes through the retardation plate 34 and is incident on the reflective polarizer 33. The reflective polarizer 33 transmits a light component which is parallel to the transmission axis, and reflects a light component which is parallel to the reflection axis. Linearly polarized light, which has passed through the reflective polarizer 33, enters the diffusion member 32.

On the other hand, linearly polarized light, which is reflected by the reflective polarizer 33, passes through the retardation plate 34 and emerges as circularly polarized light. Subsequently, the circularly polarized light, which has passed through the retardation plate 34, is reflected mainly by the reflection film 42, becomes circularly polarized light which is circularly polarized in the opposite direction, and passes through the retardation plate 34 once again. Specifically, since the linearly polarized light reflected by the reflective polarizer 33 passes through the retardation plate 34 twice, this light is optically rotated by 90°. As a result, since the linearly polarized light, which has passed through the retardation plate 34 twice, becomes parallel to the transmission axis of the reflective polarizer 33, this light passes through the reflective polarizer 33.

Thereby, most part (about 100%) of the illumination light emitted from the light-emitting elements 41 can be passed through the reflective polarizer 33. The linearly polarized light, which has passed through the reflective polarizer 33, is diffused by the diffusion member 32, and the uniformity (in-plane uniformity) is enhanced.

Subsequently, the light, which has passed through the diffusion member 32 and becomes uniform to some degree, enters the polarizer 30, and the polarizer 30 passes linearly polarized light which is parallel to the transmission axis. Then, the linearly polarized light, which passes through the polarizer 30, enters the liquid crystal layer 22.

In this manner, the light, which is to be normally absorbed by the polarizer 30, can be re-used for display. Thereby, the intensity of light, which passes through the liquid crystal display element 11, can be increased. In addition, most of the illumination light from the light-emitting elements 41 can be displayed and utilized. Thereafter, the display light, which has passed through the liquid crystal display element 11, is visually recognized by the driver 15 as the virtual image 16 via the display member 14.

[3. Modification]

Figure 5:
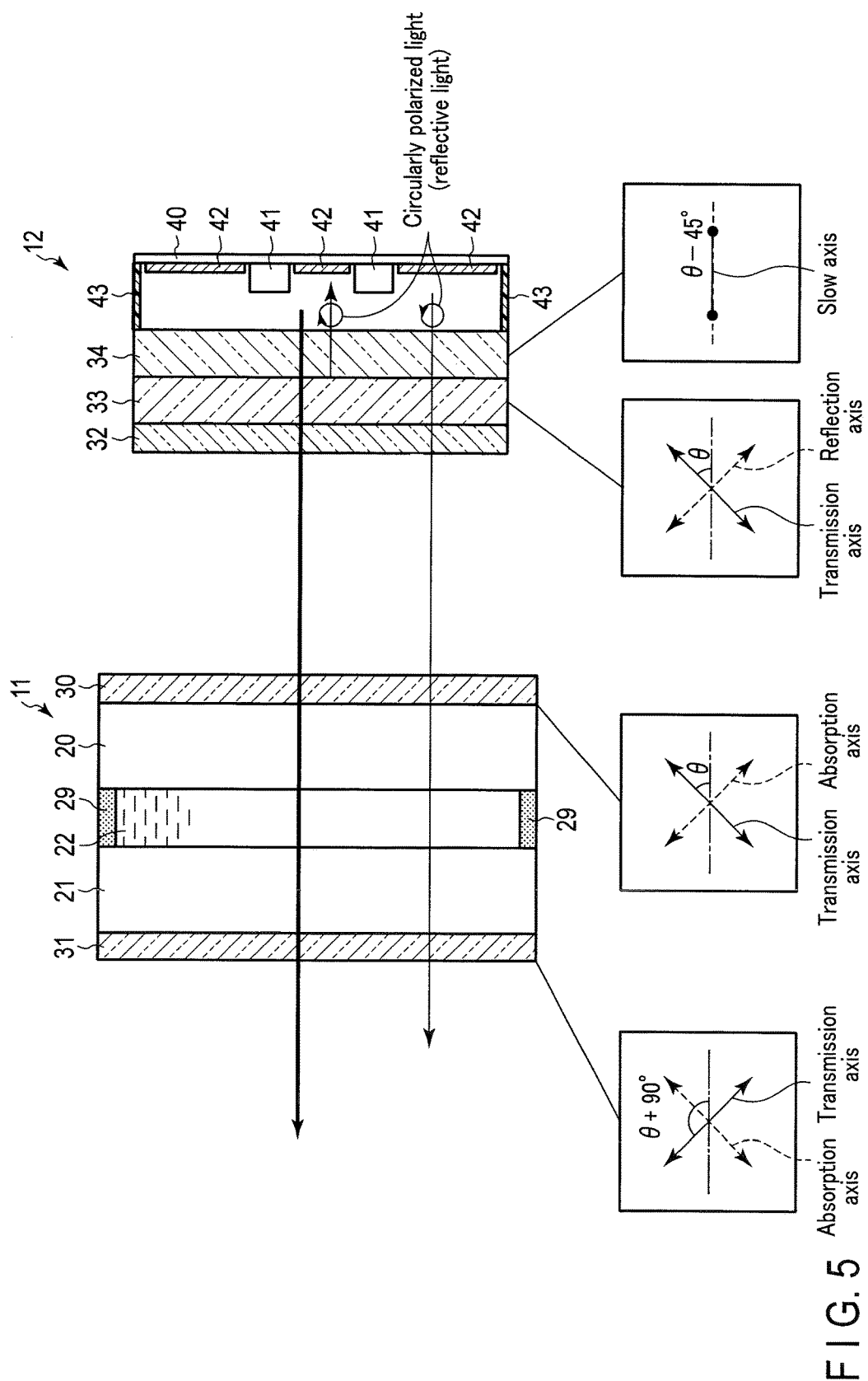
FIG. 5 is a cross-sectional view of a liquid crystal display element and a light source unit according to a modification of the first embodiment.

FIG. 5 is a cross-sectional view of a liquid crystal display element 11 and a light source unit 12 according to a modification of the first embodiment. In the modification, a multilayer structure, which is composed of the diffusion member 32, reflective polarizer 33 and retardation plate 34, is provided on the light source unit 12.

The retardation plate 34, reflective polarizer 33 and diffusion member 32 are successively stacked above the light-emitting elements 41 and on the case 43. Specifically, the diffusion member 32, reflective polarizer 33 and retardation plate 34 are assembled in the light source unit 12. The sizes of the diffusion member 32, reflective polarizer 33 and retardation plate 34 are, for example, the same as the size of the case 43.

The other configuration is the same as in the above-described first embodiment. In the modification, too, the optical path and polarization state of the illumination light emitted from the light-emitting element 41 are the same as in the first embodiment.

[4. Advantageous Effects]

As has been described above in detail, in the first embodiment, the multilayer structure, in which the diffusion member 32, reflective polarizer 33 and retardation plate 34 are successively stacked from the liquid crystal display element 11, is inserted between the liquid crystal display element 11 and the light source unit 12. In addition, the light source unit 12 is provided with the reflection film 42 that reflects once again the light, which was reflected by the reflective polarizer 33, toward the liquid crystal display element 11 side.

Therefore, according to the first embodiment, most of the illumination light emitted from the light source unit 12 can be made incident on the liquid crystal layer 22. Thereby, the luminance of the liquid crystal display element 11 can be enhanced.

In addition, even when the light intensity of the light source unit 12 is lowered, the degradation in display characteristics of the liquid crystal display element 11 can be suppressed. Thereby, the power consumption of the head-up display device 100 can be reduced.

Furthermore, the diffusion member 32 for uniformizing light is provided between the polarizer 30 and reflective polarizer 33. Thereby, since the light with enhanced uniformity can be made incident on the liquid crystal layer 22, the display characteristics of the liquid crystal display element 11 can be improved.

Figure 6:
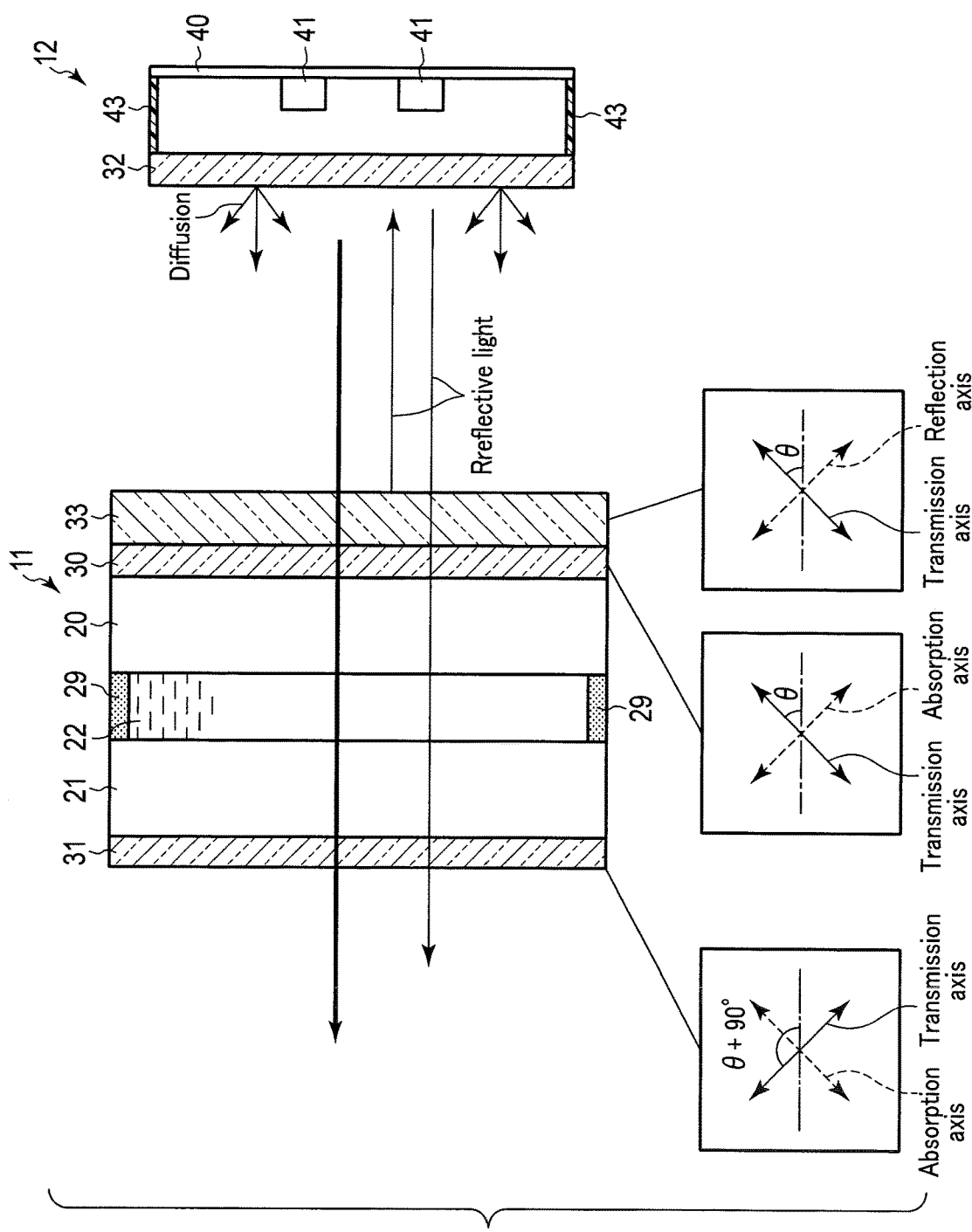
FIG. 6 is a cross-sectional view of a liquid crystal display element and a light source unit according to a comparative example 1.

FIG. 6 is a cross-sectional view of a liquid crystal display element 11 and a light source unit 12 according to a comparative example 1. In the comparative example 1, in order to enhance the in-plane uniformity of the illumination light emitted from the light-emitting elements 41, the light source unit 12 includes the diffusion member 32, and this diffusion member 32 is provided above the light-emitting elements 41 and on the case 43. The haze value of the diffusion member 32 of the comparative example 1 is, for example, 93%. In addition, the liquid crystal display element 11 includes the reflective polarizer 33 provided on that surface of the polarizer 30, which is opposite to the surface thereof facing the TFT substrate 20.

In the comparative example 1, the illumination light emitted from the light-emitting elements 41 is uniformized by the diffusion member 32, and then made incident on the reflective polarizer 33. Further, linearly polarized light passing through the reflective polarizer 33 (linearly polarized light parallel to the transmission axis of the reflective polarizer 33) passes through the polarizer 30 and enters the liquid crystal layer 22.

On the other hand, linearly polarized light reflected by the reflective polarizer 33 (linearly polarized light parallel to the reflection axis of the reflective polarizer 33) is diffused by the diffusion member 32. Part of the light diffused by the diffusion member 32 is reflected to the liquid crystal display element 11, and passes through the reflective polarizer 33. In this manner, by providing the diffusion member 32 on the light source unit 12, the luminance of the liquid crystal display element 11 is enhanced.

Figure 7:
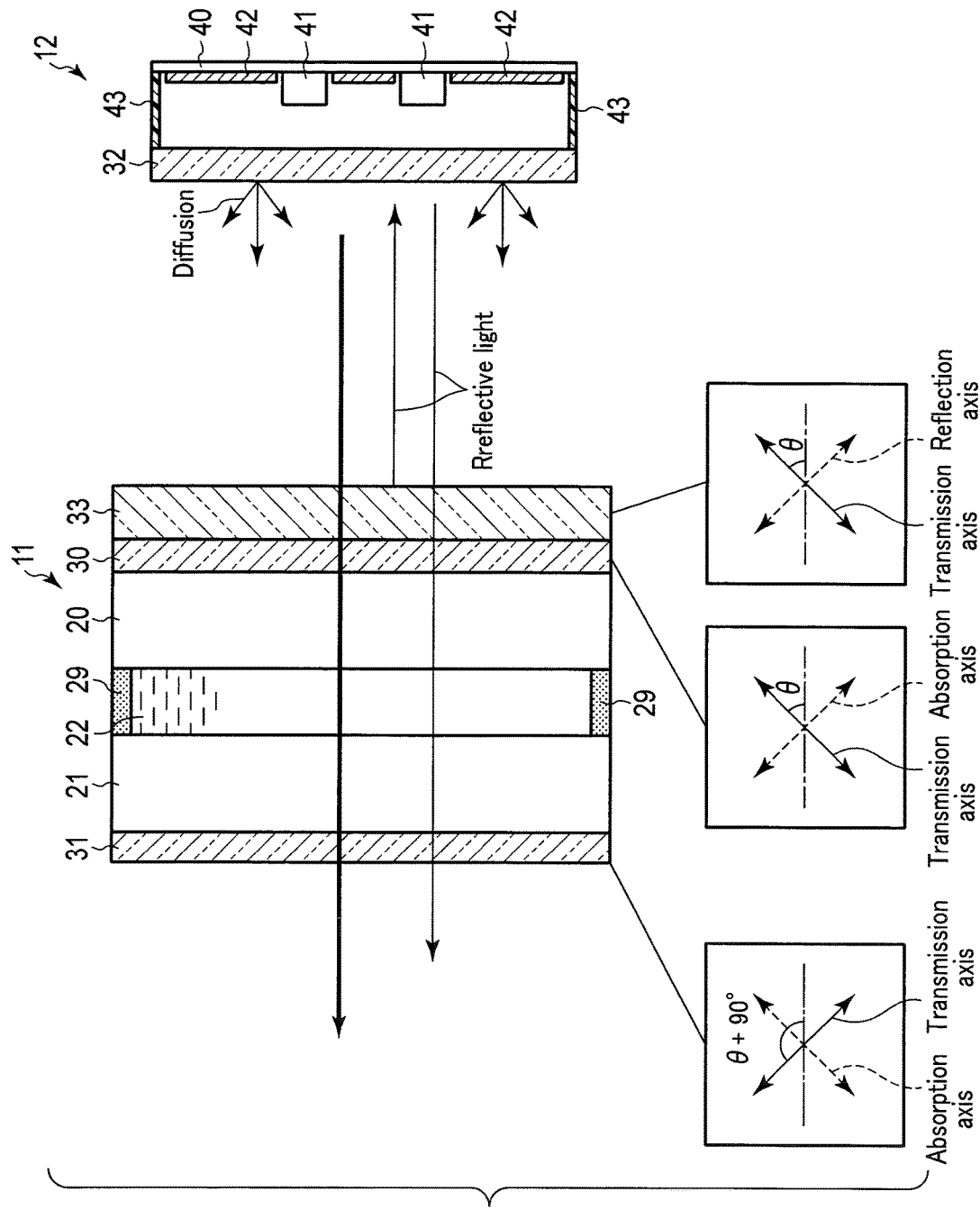
FIG. 7 is a cross-sectional view of a liquid crystal display element and a light source unit according to a comparative example 2.

FIG. 7 is a cross-sectional view of a liquid crystal display element 11 and a light source unit 12 according to a comparative example 2. The light source unit 12 includes the reflection film 42 provided on the substrate 40. The other configuration is the same as in the comparative example 1 of FIG. 6.

In the comparative example 2, linearly polarized light reflected by the reflective polarizer 33 is reflected by the reflection film 42 of the light source unit 12, and this reflected light is diffused by the diffusion member 32. Subsequently, part of the light, which passes through the diffusion member 32, passes through the reflective polarizer 33. In this manner, by providing the reflection film 42 and diffusion member 32 on the light source unit 12, the luminance of the liquid crystal display element 11 is enhanced.

FIG. 8 is a view for explaining white luminances in the comparative example 1 (FIG. 6), comparative example 2 (FIG. 7) and embodiment (first embodiment of FIG. 2). In the meantime, the white luminances in FIG. 8 are numerical values by display light of the liquid crystal display element 11. If the white luminance in the comparative example 1 is set as 100, the white luminance of the comparative example 2 is 109, and the white luminance is slightly improved by providing the reflection film 42 on the light source unit 12. In addition, by using the configuration of the embodiment (first embodiment of FIG. 2), the white luminance can be improved by 70%, compared to the comparative example 1.

[Second Embodiment]

In a second embodiment, the retardation plate (λ/4 plate) 34 is removed, and the luminance of the liquid crystal display element 11 is enhanced by using the diffusion member 32, reflective polarizer 33 and reflection film 42.

Figure 9:
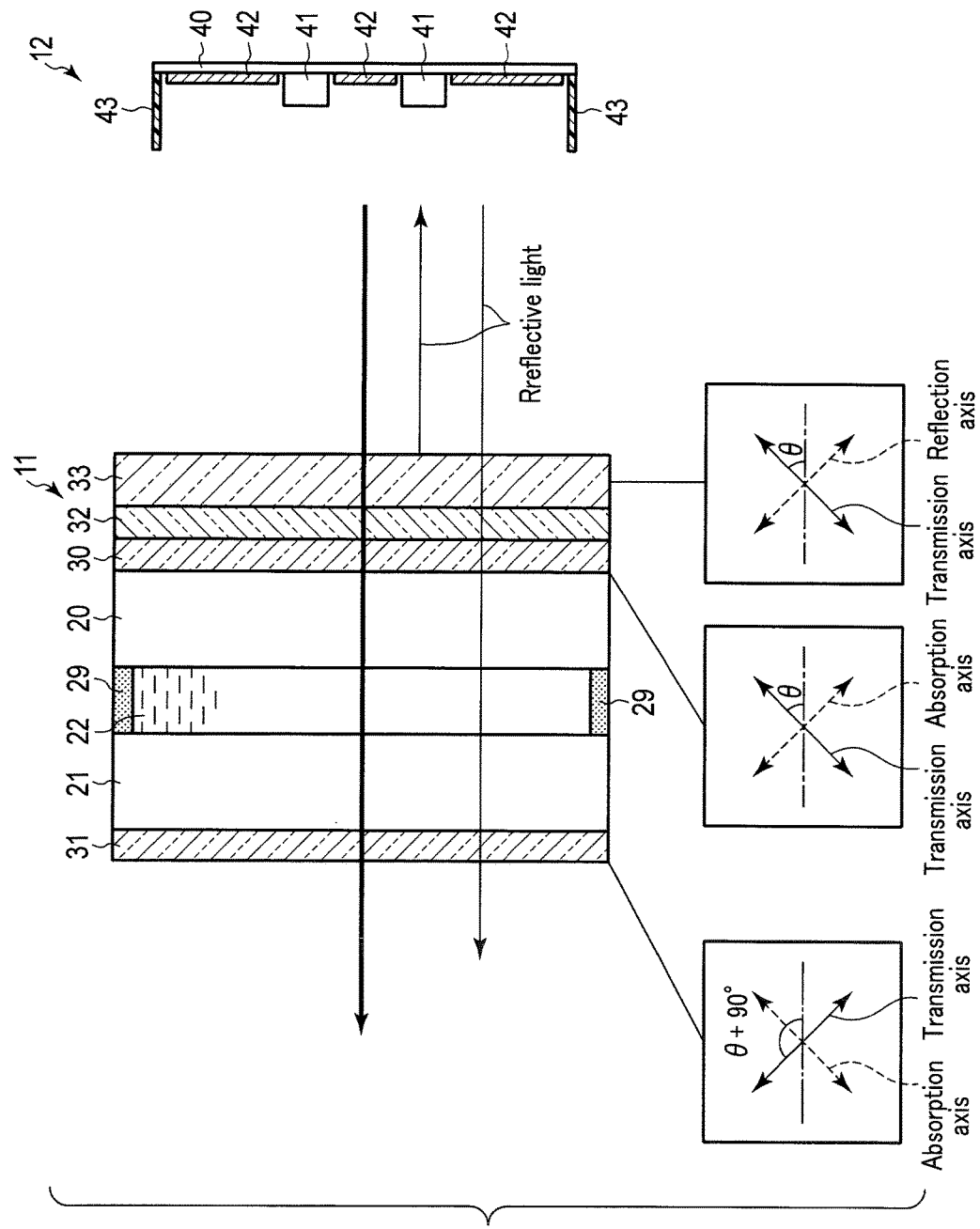
FIG. 9 is a cross-sectional view of a liquid crystal display element and a light source unit according to a second embodiment.

FIG. 9 is a cross-sectional view of a liquid crystal display element 11 and a light source unit 12 according to the second embodiment of the invention. In the liquid crystal display element 11 of the second embodiment, compared to FIG. 2 of the first embodiment, the retardation plate (λ/4 plate) 34 is removed. The other configuration in FIG. 9 is the same as in FIG. 2.

Illumination light emitted from the light-emitting elements 41 is incident on the reflective polarizer 33. Linearly polarized light, which has passed through the reflective polarizer 33, is incident on the diffusion member 32. On the other hand, linearly polarized light, which has been reflected by the reflective polarizer 33, is mainly reflected by the reflection film 42 of the light source unit 12. Reflective light, which was reflected by the reflection film 42, includes a light component whose polarization state is disturbed, and a light component parallel to the transmission axis of the reflective polarizer 33 is also generated. This light component passes through the reflective polarizer 33. Linearly polarized light, which has passed through the reflective polarizer 33, is diffused by the diffusion member 32, and the uniformity is enhanced.

As has been described above in detail, in the second embodiment, the reflective polarizer 33 and diffusion member 32 are provided in the liquid crystal display element 11, and the reflection film 42 is provided in the light source unit 12. Thereby, the luminance of the liquid crystal display element 11 can be enhanced. In addition, in the configuration of the second embodiment, since the number of members can be made less than in the first embodiment, the manufacturing cost can be reduced.

(Modification)

FIG. 10 is a cross-sectional view of a liquid crystal display element 11 and a light source unit 12 according to a modification of the second embodiment. In the modification, the multilayer structure, which is composed of the diffusion member 32 and reflective polarizer 33, is provided on the light source unit 12.

The reflective polarizer 33 and diffusion member 32 are successively stacked above the light-emitting elements 41 and on the case 43. Specifically, the diffusion member 32 and reflective polarizer 33 are assembled in the light source unit 12. The other configuration is the same as in the above-described second embodiment. In the modification, too, the optical path and polarization state of the illumination light emitted from the light-emitting element 41 are the same as in the second embodiment.

[Third Embodiment]

In a third embodiment, the reflection film 42 provided in the light source unit 12 is removed, and the luminance of the liquid crystal display element 11 is enhanced by using the diffusion member 32, reflective polarizer 33 and retardation plate (λ/4 plate) 34.

Figure 11:
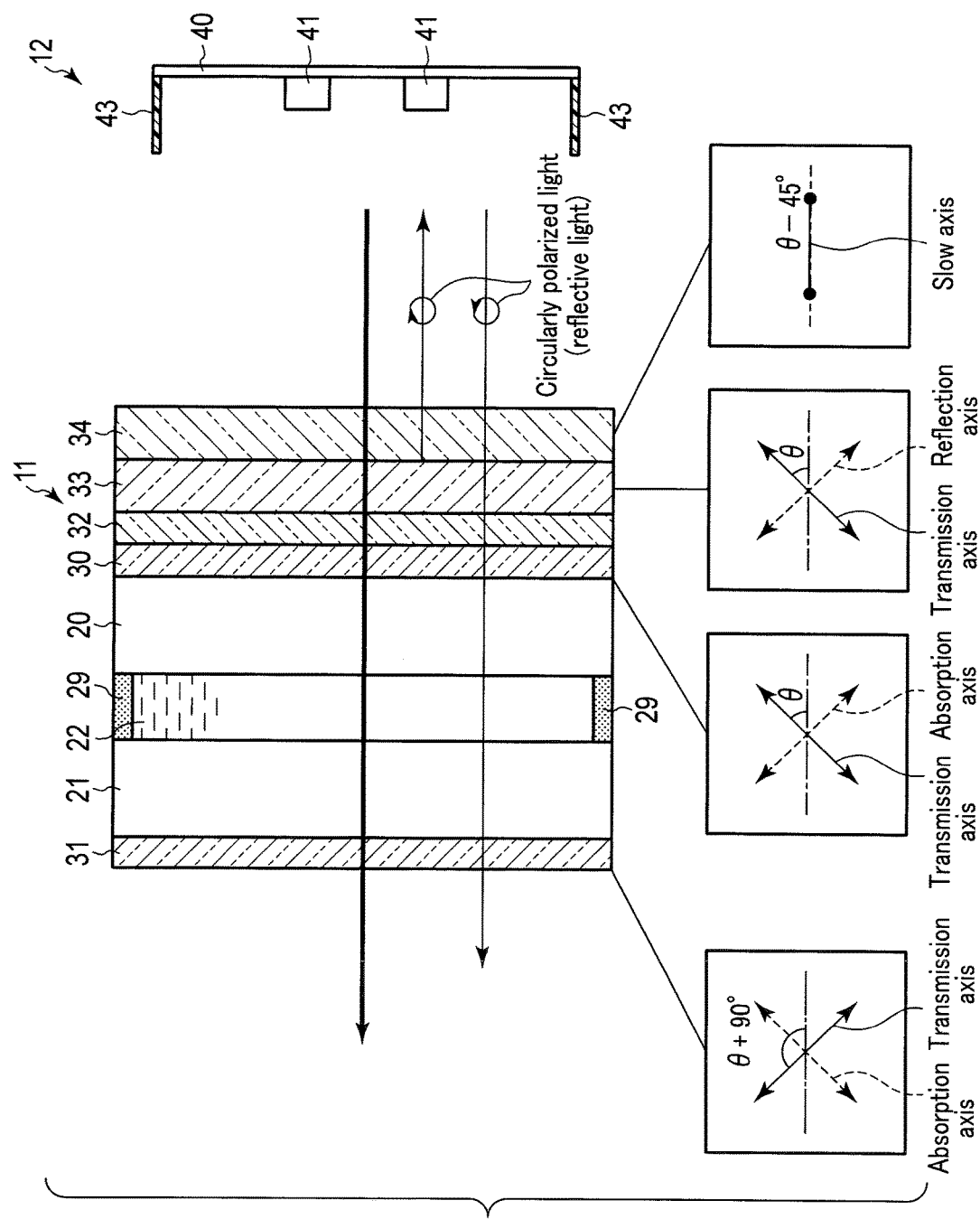
FIG. 11 is a cross-sectional view of a liquid crystal display element and a light source unit according to a third embodiment.

FIG. 11 is a cross-sectional view of a liquid crystal display element 11 and a light source unit 12 according to the third embodiment of the invention. The liquid crystal display element 11 of the third embodiment has the same configuration as the liquid crystal display element 11 shown in FIG.

2 of the first embodiment. Compared to FIG. 2 of the first embodiment, the reflection film 42 is removed from the light source unit 12 of the third embodiment.

The substrate 40 of the light source unit 12 has a planar surface with light reflectivity, that is, a reflective surface which reflects light. The substrate 40 is disposed such that the reflective surface thereof is opposed to the liquid crystal display element 11. The substrate 40 is composed of, for example, a glass epoxy substrate. Although the reflectance of the substrate 40 is lower than the reflectance of the reflection film 42, the substrate 40 reflects light from the retardation plate 34 side.

Linearly polarized light, which is reflected by the reflective polarizer 33, passes through the retardation plate 34 and emerges as circularly polarized light. Subsequently, the circularly polarized light, which has passed through the retardation plate 34, is reflected mainly by the substrate 40, becomes circularly polarized light which is circularly polarized in the opposite direction, and passes through the retardation plate 34 once again. As a result, since the linearly polarized light, which has passed through the retardation plate 34 twice, becomes parallel to the transmission axis of the reflective polarizer 33, this light passes through the reflective polarizer 33. The linearly polarized light, which has passed through the reflective polarizer 33, is diffused by the diffusion member 32, and the uniformity is enhanced.

As has been described above in detail, in the third embodiment, the reflective light, which was reflected by the reflective polarizer 33, is reflected by the substrate 40 of the light source unit 12. Thereby, the luminance of the liquid crystal display element 11 can be enhanced. In addition, in the configuration of the third embodiment, since the number of members can be made less than in the first embodiment, the manufacturing cost can be reduced.

(Modification)

FIG. 12 is a cross-sectional view of a liquid crystal display element 11 and a light source unit 12 according to a modification of the third embodiment. In the modification, the multilayer structure, which is composed of the diffusion member 32, reflective polarizer 33 and retardation plate 34, is provided on the light source unit 12.

The retardation plate 34, reflective polarizer 33 and diffusion member 32 are successively stacked above the light-emitting elements 41 and on the case 43. Specifically, the diffusion member 32, reflective polarizer 33 and retardation plate 34 are assembled in the light source unit 12. The other configuration is the same as in the above-described third embodiment. In the modification, too, the optical path and polarization state of the illumination light emitted from the light-emitting element 41 are the same as in the third embodiment.

[Fourth Embodiment]

In a fourth embodiment, the retardation plate (λ/4 plate) 34, and the reflection film 42 provided in the light source unit 12 are removed, and the luminance of the liquid crystal display element 11 is enhanced by using the diffusion member 32 and reflective polarizer 33.

Figure 13:
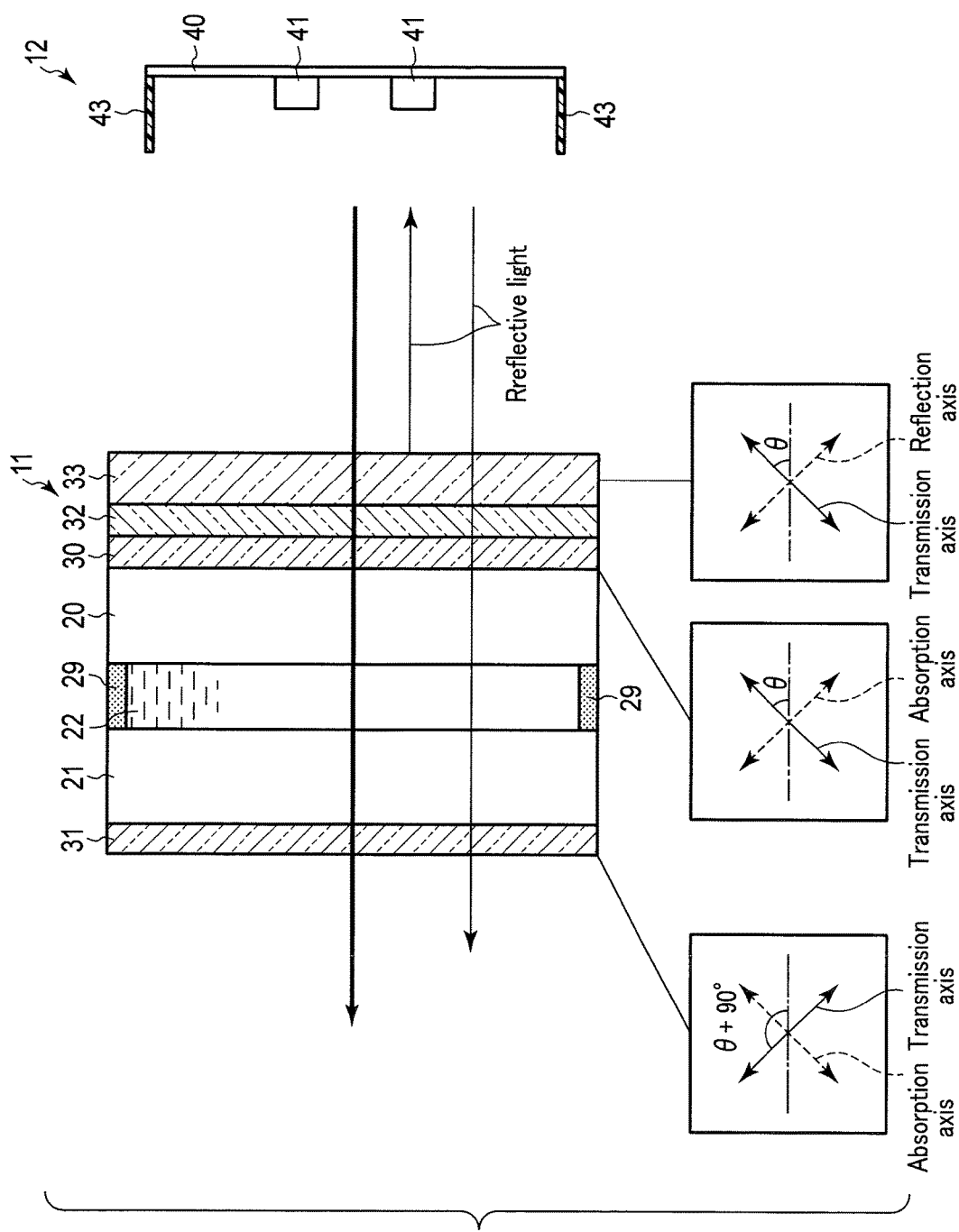
FIG. 13 is a cross-sectional view of a liquid crystal display element and a light source unit according to a fourth embodiment.

FIG. 13 is a cross-sectional view of a liquid crystal display element 11 and a light source unit 12 according to the fourth embodiment of the invention. The liquid crystal display element 11 of the fourth embodiment has the same configuration as the liquid crystal display element 11 shown in FIG. 9 of the second embodiment. Compared to FIG. 9 of the second embodiment, the reflection film 42 is removed from the light source unit 12 of the fourth embodiment.

The substrate 40 of the light source unit 12 is composed of, for example, a glass epoxy substrate. Although the reflectance of the substrate 40 is lower than the reflectance of the reflection film 42, the substrate 40 reflects light which was reflected by the reflective polarizer 33. In the reflective light which was reflected by the substrate 40, a light component whose polarization state is disturbed is generated, and a light component parallel to the transmission axis of the reflective polarizer 33 is also generated. This light component passes through the reflective polarizer 33. Linearly polarized light, which has passed through the reflective polarizer 33, is diffused by the diffusion member 32, and the uniformity is enhanced.

As has been described above in detail, in the fourth embodiment, the reflective polarizer 33 and diffusion member 32 are provided in the liquid crystal display element 11, and the linearly polarized light, which was reflected by the reflective polarizer 33, is reflected by the substrate 40 of the light source unit 12. Thereby, the luminance of the liquid crystal display element 11 can be enhanced. In addition, in the configuration of the fourth embodiment, since the number of members can be made less than in the second embodiment, the manufacturing cost can be reduced.

(Modification)

FIG. 14 is a cross-sectional view of a liquid crystal display element 11 and a light source unit 12 according to a modification of the fourth embodiment. In the modification, the multilayer structure, which is composed of the diffusion member 32 and reflective polarizer 33, is provided on the light source unit 12.

The reflective polarizer 33 and diffusion member 32 are successively stacked above the light-emitting elements 41 and on the case 43. Specifically, the diffusion member 32 and reflective polarizer 33 are assembled in the light source unit 12. The other configuration is the same as in the above-described fourth embodiment. In the modification, too, the optical path and polarization state of the illumination light emitted from the light-emitting element 41 are the same as in the fourth embodiment.

The present invention is not limited to the embodiments described above, and can be embodied by modifying constituent elements without departing from the gist of the invention. In addition, the above embodiments include inventions of various stages, and various inventions can be formed by proper combinations of a plurality of constituent elements disclosed in one embodiment or proper combinations of constituent elements disclosed in different embodiments. When, for example, the problems to be solved by the present invention can be solved and the effects of the invention can be obtained even if several constituent elements are omitted from all the constituent elements disclosed in each embodiment, an embodiment from which these constituent elements are omitted can be extracted as an invention.

What is claimed is:

1. A head-up display device, comprising:
   a light source unit including
      a substrate,
      a plurality of light-emitting elements provided on a first area of a surface of the substrate,
      a reflection film having a planar shape and provided on a second area of the surface of the substrate, the second area being unoccupied by the plurality of light-emitting elements,
      a case provided on a circumferential edge portion of the substrate,
      a retardation plate, provided on the case so as to be apart from the reflection film and having a bottom surface facing the reflection film, to impart a retardation of λ/4 to light, wherein the bottom surface directly contacts a top surface of the case and a bottom surface of the case directly contacts the surface of the substrate, a reflective polarizer, provided on the retardation plate, to reflect a light component that is parallel to a reflection axis, and a diffusion member, provided on the reflective polarizer, to diffuse light; and a liquid crystal display element through which light emitted from the plurality of light-emitting elements passes, the liquid crystal display element being spaced apart from the light source unit and including a first polarizer provided on the light source unit side, and a second polarizer disposed to be opposed to the first polarizer via a liquid crystal layer.

2. The head-up display of claim 1, wherein a transmission axis of the reflective polarizer is parallel to a transmission axis of the first polarizer.

3. The head-up display of claim 1, wherein a slow axis of the retardation plate is set at an angle of 45° to a transmission axis of the reflective polarizer.

4. The head-up display of claim 1, wherein the diffusion member is composed of a diffusion adhesive material, a diffusion film or a diffusion plate, and a haze value of the diffusion member is 60% or more, and 95% or less.

5. The head-up display device of claim 1, further comprising:

a reflection member which reflects display light which is optically modulated by the liquid crystal display element; and a display member on which reflective light, which is reflected by the reflection member, is projected.

6. A head-up display device, comprising:
a light source unit including
a substrate having a surface that reflects light,
a plurality of light-emitting elements provided on a portion of the surface of the substrate,
a case provided on a circumferential edge portion of the substrate,
a retardation plate, provided on the case so as to be apart from the surface of substrate and having a bottom surface facing the surface of the substrate, to impart a retardation of λ/4 to light, wherein the bottom surface directly contacts a top surface of the case and a bottom surface of the case directly contacts the surface of the substrate,
a reflective polarizer, provided on the retardation plate, to reflect a light component that is parallel to a reflection axis, and
a diffusion member, provided on the reflective polarizer, to diffuse light; and
a liquid crystal display element through which light emitted from the plurality of light-emitting elements passes, the liquid crystal display element being spaced apart from the light source unit and including
a first polarizer provided on the light source unit side, and
a second polarizer disposed to be opposed to the first polarizer via a liquid crystal layer.

7. The head-up display of claim 6, wherein a transmission axis of the reflective polarizer is parallel to a transmission axis of the first polarizer.

8. The head-up display of claim 6, wherein a slow axis of the retardation plate is set at an angle of 45° to a transmission axis of the reflective polarizer.

9. The head-up display of claim 6, wherein the diffusion member is composed of a diffusion adhesive material, a diffusion film or a diffusion plate, and a haze value of the diffusion member is 60% or more, and 95% or less.

10. The head-up display device of claim 6, further comprising:

a reflection member which reflects display light which is optically modulated by the liquid crystal display element; and a display member on which reflective light, which is reflected by the reflection member, is projected.

* * * * *